(12) United States Patent
Tomioka et al.

(10) Patent No.: US 12,384,407 B2
(45) Date of Patent: Aug. 12, 2025

(54) PATH GENERATION APPARATUS AND PATH GENERATION METHOD

(71) Applicant: Honda Motor Co., Ltd., Tokyo (JP)

(72) Inventors: Kazuki Tomioka, Tokyo (JP); Hiroyasu Kubota, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 217 days.

(21) Appl. No.: 18/098,688

(22) Filed: Jan. 18, 2023

(65) Prior Publication Data
US 2023/0234607 A1   Jul. 27, 2023

(30) Foreign Application Priority Data
Jan. 24, 2022 (JP) ................................. 2022-008737

(51) Int. Cl.
*B60W 60/00* (2020.01)

(52) U.S. Cl.
CPC ..... *B60W 60/001* (2020.02); *B60W 2420/403* (2013.01); *B60W 2520/10* (2013.01); *B60W 2552/10* (2020.02); *B60W 2554/4041* (2020.02); *B60W 2554/406* (2020.02); *B60W 2554/804* (2020.02)

(58) Field of Classification Search
None
See application file for complete search history.

(56) References Cited

U.S. PATENT DOCUMENTS

| | | | | |
|---|---|---|---|---|
| 2016/0129907 | A1* | 5/2016 | Kim | G06V 20/588 701/26 |
| 2018/0093676 | A1* | 4/2018 | Emura | G01C 21/3605 |
| 2018/0113450 | A1* | 4/2018 | Sherony | B60W 30/18163 |
| 2018/0162396 | A1 | 6/2018 | Ibuka et al. | |
| 2019/0283747 | A1 | 9/2019 | Okabe et al. | |
| 2020/0298858 | A1* | 9/2020 | Stenneth | B60W 30/18163 |

FOREIGN PATENT DOCUMENTS

| | | |
|---|---|---|
| JP | 2018094960 A | 6/2018 |
| JP | 2018118589 A | 8/2018 |
| JP | 2019159756 A | 9/2019 |

OTHER PUBLICATIONS

Japanese office action; Application 2022-008737; Dec. 5, 2023.

* cited by examiner

*Primary Examiner* — James J Lee
*Assistant Examiner* — Elizabeth Galyn Martinez
(74) *Attorney, Agent, or Firm* — Duft & Bornsen, PC (57) ABSTRACT

Path generation apparatus configured to generate target path of own vehicle traveling in own lane, includes: sensor configured to detect objects in surrounding area of own vehicle; and electronic control unit including processor and memory. Electronic control unit is configured to perform: recognizing adjacent vehicle traveling in adjacent lane adjacent to own lane from among detected objects; determining whether own lane is congested based on travel speed of own vehicle and determining whether adjacent lane is congested based on recognition result of adjacent lane; and generating target path of own vehicle. Generating target path includes generating target path on side away from adjacent lane with respect to that of case where own lane is determined to be congested and adjacent lane is determined to be congested, in case where own lane is determined to be congested and adjacent lane is determined not to be congested.

10 Claims, 13 Drawing Sheets

PATH GENERATION APPARATUS AND PATH GENERATION METHOD

CROSS-REFERENCE TO RELATED APPLICATION

This application is based upon and claims the benefit of priority from Japanese Patent Application No. 2022-008737 filed on Jan. 24, 2022, the content of which is incorporated herein by reference.

BACKGROUND OF THE INVENTION

Field of the Invention

This invention relates to a path generation apparatus and a path generation method configured to generate a target path of a vehicle having an automatic driving function or a driving-assistance function.

Description of the Related Art

A device that generates a target path of a vehicle for driving automatically is conventionally known (for example, see JP2018-118589A). In the device described in JP2018-118589A, the positions of division lines on both left and right sides of a travel lane are recognized by use of a camera or a radar sensor, the center point between two points facing each other on the left and right division lines is obtained, and the target path is generated by connecting a plurality of center points.

As vehicles each having an automatic driving function and a driving-assistance function become widely used, the safety and convenience of the entire traffic society are improved, and a sustainable transportation system is achievable. In addition, as the efficiency and smoothness of transportation are improved, $CO_2$ emission amounts are reduced, and loads on the environment can be reduced.

However, when an adjacent lane is not congested, although an own lane is congested, if the target path is generated simply along the center of the own lane as in the device described in JP2018-118589A, an occupant may feel uneasy because another vehicle passes by on a lateral side of the own vehicle.

SUMMARY OF THE INVENTION

An aspect of the present invention is a path generation apparatus configured to generate a target path of an own vehicle traveling in an own lane, including: a sensor configured to detect objects in a surrounding area of the own vehicle; and an electronic control unit including a processor and a memory coupled to the processor. The electronic control unit is configured to perform: recognizing an adjacent vehicle traveling in an adjacent lane adjacent to the own lane from among the objects detected by the sensor; determining whether the own lane is congested based on a travel speed of the own vehicle and determining whether the adjacent lane is congested based on a recognition result of the adjacent lane; and generating the target path of the own vehicle. The generating the target path includes generating the target path on a side away from the adjacent lane with respect to that of a case where the own lane is determined to be congested and the adjacent lane is determined to be congested, in a case where the own lane is determined to be congested and the adjacent lane is determined not to be congested.

Another aspect of the present invention is a path generation method configured to generate a target path of an own vehicle traveling in an own lane, including: recognizing an adjacent vehicle traveling in an adjacent lane adjacent to the own lane from among objects in a surrounding area of the own vehicle detected by a sensor; determining whether the own lane is congested based on a travel speed of the own vehicle and determining whether the adjacent lane is congested based on a recognition result of the adjacent lane; and generating the target path of the own vehicle. The generating the target path includes generating the target path on a side away from the adjacent lane with respect to that of a case where the own lane is determined to be congested and the adjacent lane is determined to be congested, in a case where the own lane is determined to be congested and the adjacent lane is determined not to be congested.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to FIGS. 1 to 9. A path generation apparatus according to an embodiment of the present invention is applied to a vehicle having a driving-assistance function of controlling a travel actuator to conduct driving assistance for a driver of the own vehicle or to automatically drive the own vehicle, and generates a target path (target travel path) of the own vehicle. The "driving assistance" in the present embodiment includes driving assistance for assisting driver's driving operations and automatic driving for automatically driving a vehicle without depending on the driver's driving operations, and corresponds to levels 1 to 4 of driving automation defined by SAE, and the "automatic driving" corresponds to the level 5 driving automation.

During driving assistance or automatic driving, for example, a target path is generated along the center of the own lane, based on a recognition result of the surroundings of the own vehicle by a camera or the like, and the own vehicle is controlled to travel along the target path that has been generated. However, when an adjacent lane is not congested, although an own lane is congested, if the target path is generated simply along the center of the own lane, an occupant may feel uneasy because another vehicle passes by on a lateral side of the own vehicle. Therefore, in the present embodiment, the path generation apparatus is configured as follows so as to be capable of mitigating an occupant's uneasy feeling caused by another vehicle passing by on a lateral side of the own vehicle, even when the adjacent lane is not congested, although the own lane is congested.

Figure 1:
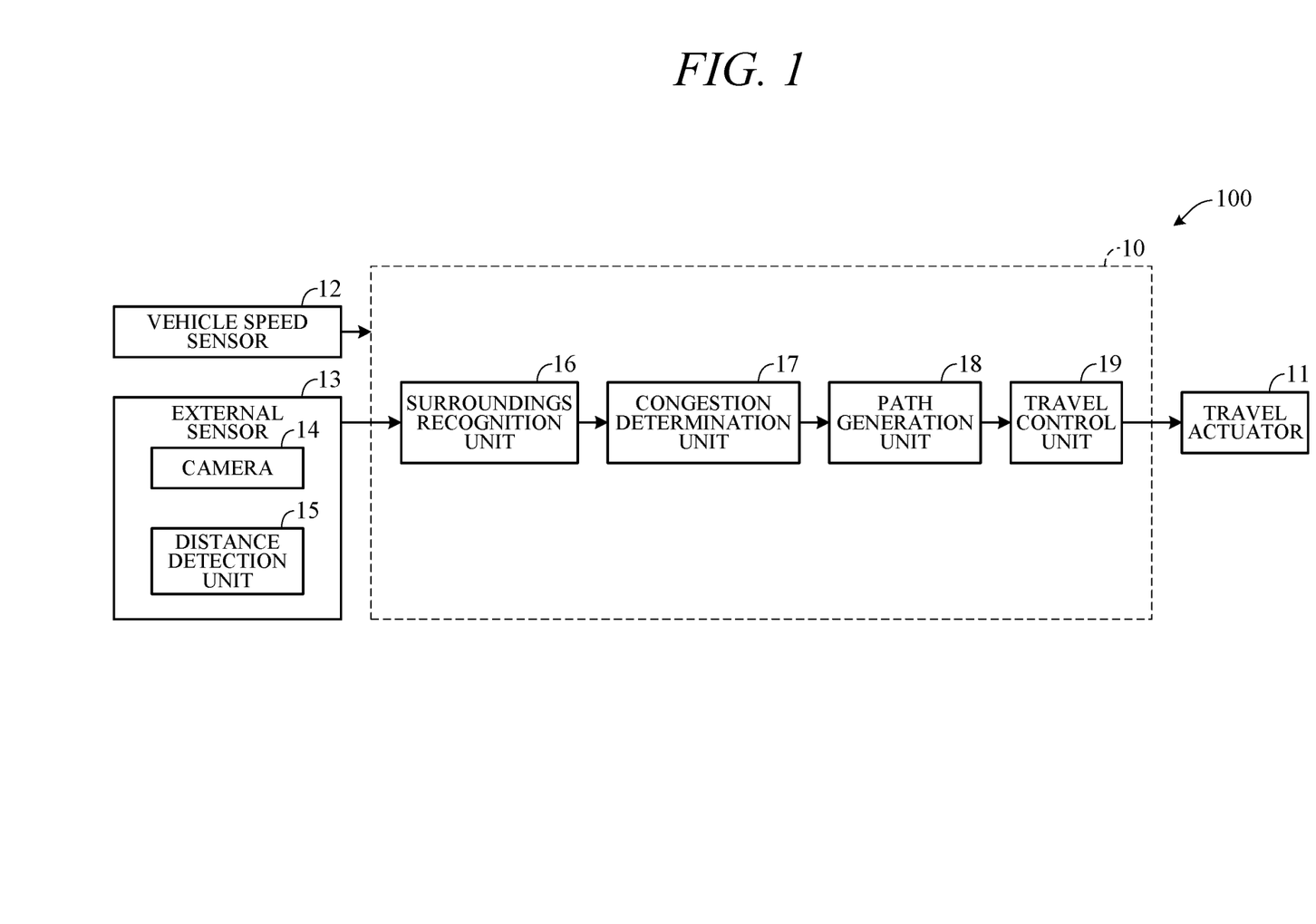
FIG. 1 is a block diagram schematically illustrating an example of a configuration of main components and a processing flow of a path generation apparatus according to an embodiment of the present invention.

FIG. 1 is a block diagram schematically illustrating an example of a configuration of main components and a processing flow of a path generation apparatus (hereinafter, an apparatus) 100 according to an embodiment of the present invention. As illustrated in FIG. 1, the apparatus 100 mainly includes an electronic control unit (ECU) 10. The ECU 10 includes a computer including a (processor) such as a CPU, a storage unit (memory) such as a RAM and a ROM, an I/O interface, and other peripheral circuits. The ECU 10 is configured, for example, as a part of a plurality of ECU groups that are mounted on an own vehicle 1 and that control the operation of the own vehicle 1. The processing of FIG. 1 is started, for example, when the own vehicle 1 starts operating and the ECU 10 is activated, and is repeated at a predetermined cycle.

A travel actuator 11, a vehicle speed sensor 12, and an external sensor 13, which are mounted on the own vehicle 1, are connected with the ECU 10. The travel actuator 11 includes a driving mechanism such as an engine or a motor that drives the own vehicle 1, a braking mechanism such as a brake that applies the brakes of the own vehicle 1, and a steering mechanism such as a steering gear that steers the own vehicle 1. The vehicle speed sensor 12 includes, for example, a wheel speed sensor that detects a rotation speed of a wheel, and detects a travel speed of the own vehicle 1.

The external sensor 13 detects an external situation including a location of an object in a surrounding area including rear lateral sides of the own vehicle 1. The external sensor 13 includes an imaging element such as a CCD or a CMOS, and includes a camera 14, which images surroundings of the own vehicle 1, and a distance detection unit 15, which detects a distance from the own vehicle 1 to an object in a surrounding area. The distance detection unit 15 includes, for example, a millimeter wave radar that irradiates a millimeter waves (radio wave) and measures a distance and a direction to an object by use of a period of time until the irradiated wave hits the object and then returns. The distance detection unit 15 may include a light detection and ranging (LiDAR) that irradiates laser light and measures a distance and a direction to an object by use of a period of time until the irradiated light hits the object and then returns.

The ECU 10 includes a surroundings recognition unit 16, a congestion determination unit 17, a path generation unit 18, and a travel control unit 19, as functional configurations of an arithmetic unit. Specifically, the arithmetic unit of the ECU 10 functions as the surroundings recognition unit 16, the congestion determination unit 17, the path generation unit 18, and the travel control unit 19.

The surroundings recognition unit 16 recognizes a location of a division line, a curbstone, a guardrail, or the like on a road in a surrounding area with an advancing direction of the own vehicle 1 as the center, based on a signal from the external sensor 13, and thus recognizes an own lane 2 in which the own vehicle 1 is traveling, and adjacent lanes 3a and 3b, which are adjacent to the own lane 2. In addition, other vehicles are recognized by recognizing the positions of the contours of other vehicles including a preceding vehicle 4, which is traveling on a forward side of the own vehicle 1 in the own lane 2, and adjacent vehicles 5a and 5b, which are respectively traveling in the adjacent lanes 3a and 3b.

The congestion determination unit 17 determines whether the own lane 2 is congested, based on the travel speed of the own vehicle 1 that has been detected by the vehicle speed sensor 12. More specifically, in a case where the travel speed of the own vehicle 1 is equal to or lower than a predetermined speed, it is determined that the own lane 2 is congested, and in a case where the travel speed exceeds the predetermined speed, it is determined that the own lane 2 is not congested. The congestion determination unit 17 may further determine whether the own lane 2 is congested in consideration of an inter-vehicle distance between the own vehicle 1 and the preceding vehicle 4. In this case, in a case where the inter-vehicle distance is equal to or shorter than a predetermined distance, it is determined that the own lane 2 is congested, and in a case where the inter-vehicle distance exceeds the predetermined distance, it is determined that the own lane 2 is not congested. The predetermined speed and the predetermined distance may be set in accordance with a speed limit or the like of the road on which the vehicle is traveling.

In a case where it is determined that the own lane 2 is congested, the congestion determination unit 17 identifies relative speeds of the adjacent vehicles 5a and 5b with respect to the own vehicle 1, based on recognition results by the surroundings recognition unit 16, and determines whether the adjacent lanes 3a and 3b are congested based on the relative speeds that have been identified. More specifically, in a case where the relative speeds that have been identified are equal to or lower than a predetermined relative speed, it is determined that the adjacent lanes 3a and 3b are congested, and in a case where the relative speeds that have been identified exceed the predetermined relative speed, it is determined that the adjacent lanes 3a and 3b are not congested. The predetermined relative speed is set as a relative speed with which the occupant possibly feels uneasy, when the adjacent vehicles 5a and 5b each pass by on the lateral sides of the own vehicle 1. The predetermined relative speed may be set in accordance with a lane width or the like of the road on which the vehicle is traveling.

Figure 2:
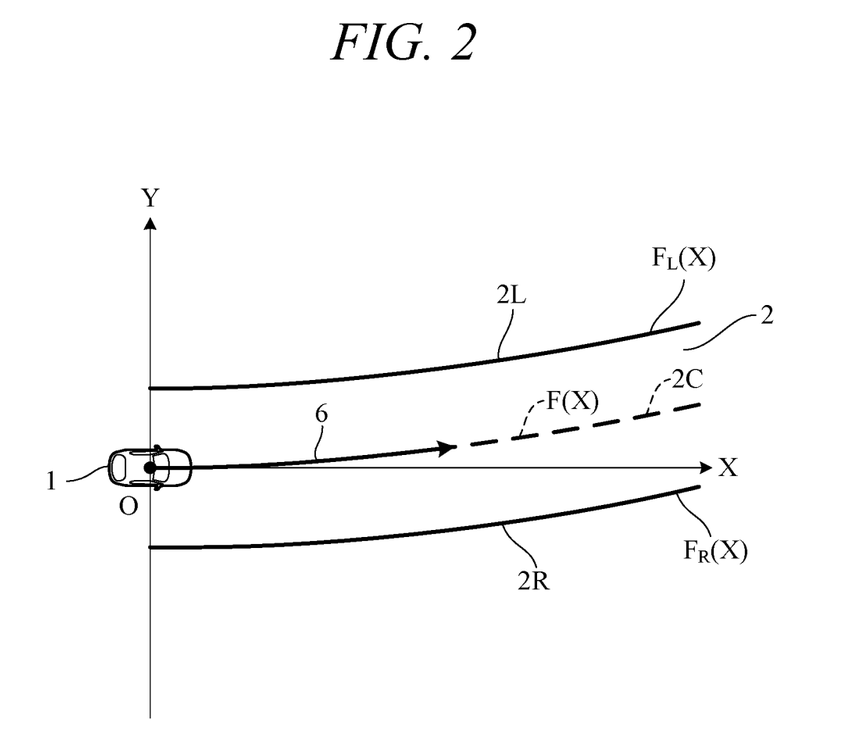
FIG. 2 is a diagram for describing generation of a reference target path by a path generation unit shown in FIG. 1.

FIG. 2 is a diagram for describing generation of a reference target path by the path generation unit 18. The path generation unit 18 generates a reference target path 6 along the center of the own lane 2 in which the own vehicle 1 is traveling, based on, for example, a recognition result by the surroundings recognition unit 16. A typical road shape is designed with a clothoid curve in which the curvature changes at a certain rate, and some sections of the clothoid curve corresponding to the road shape can be approximated by use of a higher-order function such as a cubic function.

The path generation unit 18 identifies an advancing direction of the own vehicle 1 with respect to the own lane 2, based on a recognition result by the surroundings recognition unit 16, and derives a cubic function F(X) representing a center line 2C of the own lane 2 with a current location point of the own vehicle 1 as an origin O and the identified advancing direction as x-axis. Specifically, cubic functions $F_L(X)$ and $F_R(X)$ of following Expressions (i) and (ii), which respectively approximate the left and right division lines (or curbstones, guardrails, or the like) 2L and 2R that have been recognized by the surroundings recognition unit 16, are derived by use of a curve fitting method such as a least squares method.

$$F_L(X) = C_{3L}X^3 + C_{2L}X^2 + C_{1L}X + C_{0L} \quad (i)$$

$$F_R(X) = C_{3R}X^3 + C_{2R}X^2 + C_{1R}X + C_{0R} \quad (ii)$$

Next, a cubic function F(X) of a following Expression (iii) corresponding to the center line 2C of the own lane 2 is derived, based on the cubic functions $F_L(X)$ and $F_R(X)$ respectively corresponding to the left and right division lines 2L and 2R, and the reference target path 6 is generated along the center line 2C, which is represented by the cubic function F(X) that has been derived.

$$F(X) = C_3 X^3 + C_2 X^2 + C_1 X + C_0$$

$$C_3 = (C_{3L} + C_{3R})/2, C_2 = (C_{2L} + C_{2R})/2$$

$$C_1 = (C_{1L} + C_{1R})/2, C_0 = (C_{0L} + C_{0R})/2 \quad (iii)$$

Figure 3A:
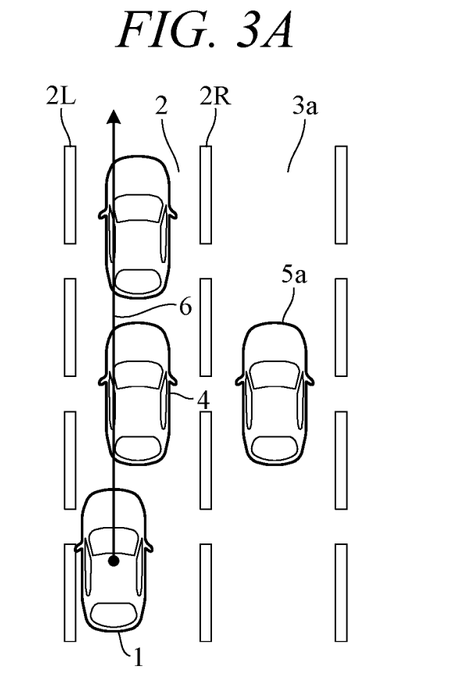
FIG. 3A is a diagram illustrating an example of a target path in a case where an own lane is congested and an adjacent lane is not congested.
Figure 3B:
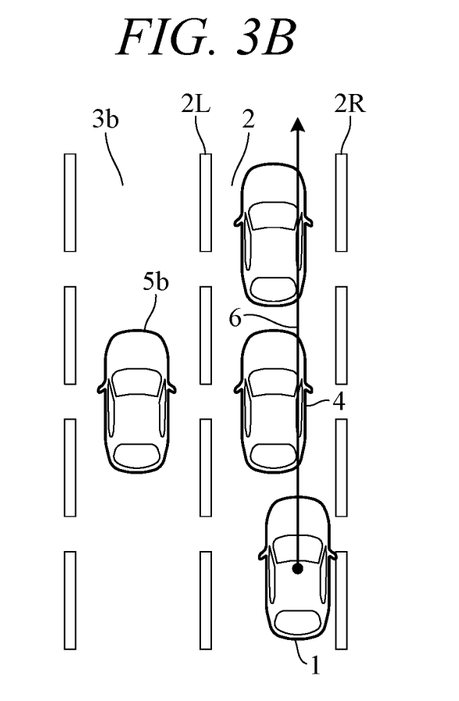
FIG. 3B is a diagram illustrating a modification of FIG. 3A.
Figure 4A:
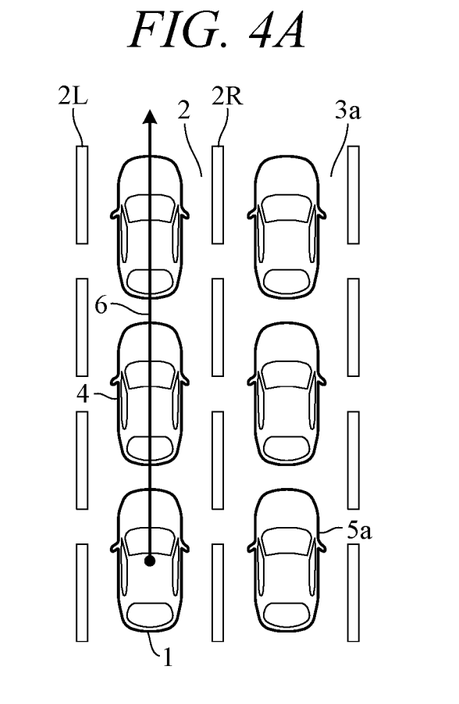
FIG. 4A is a diagram illustrating an example of the target path in a case where both the own lane and the adjacent lane are congested.
Figure 4B:
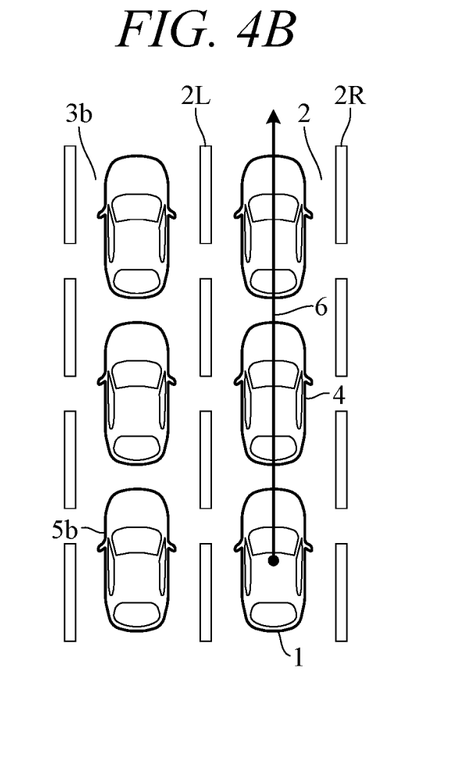
FIG. 4B is a diagram illustrating a modification of FIG. 4A.
Figure 5A:
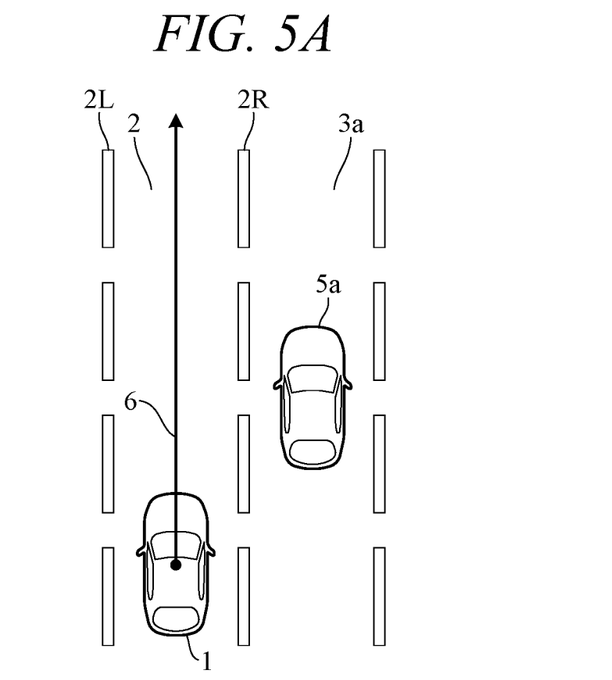
FIG. 5A is a diagram illustrating an example of the target path in a case where the own lane is not congested.
Figure 5B:
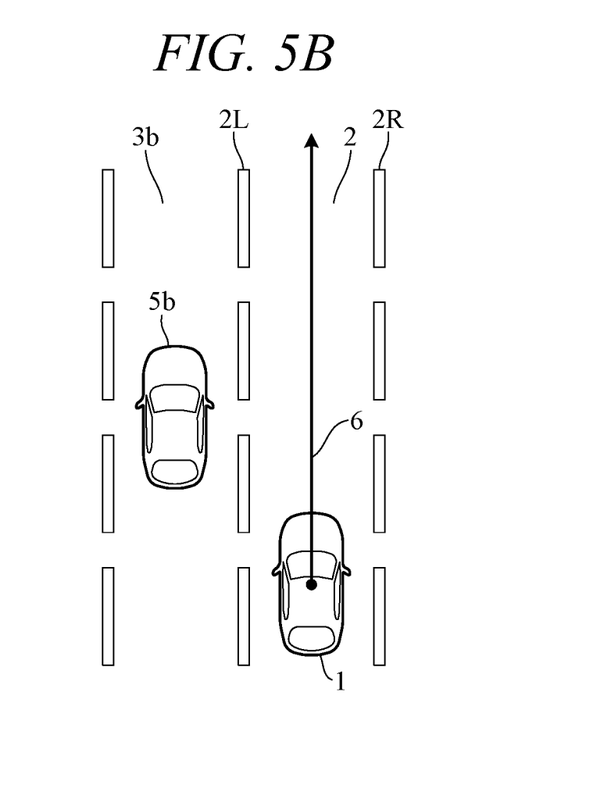
FIG. 5B is a diagram illustrating a modification of FIG. 5A.
Figure 6A:
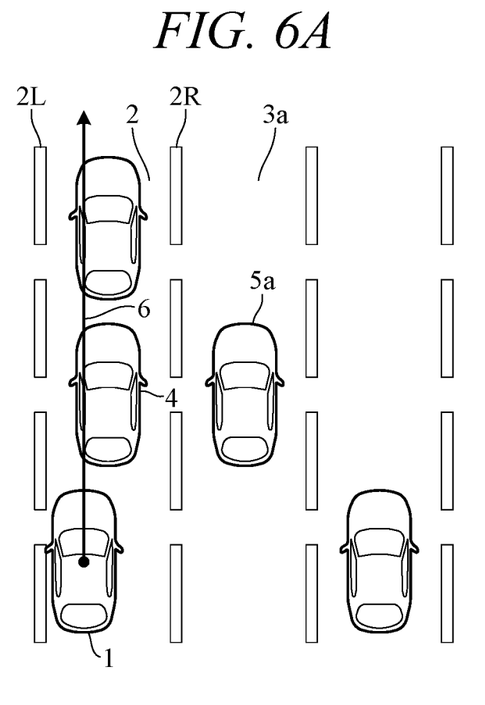
FIG. 6A is a diagram illustrating a modification of FIG. 3A.
Figure 6B:
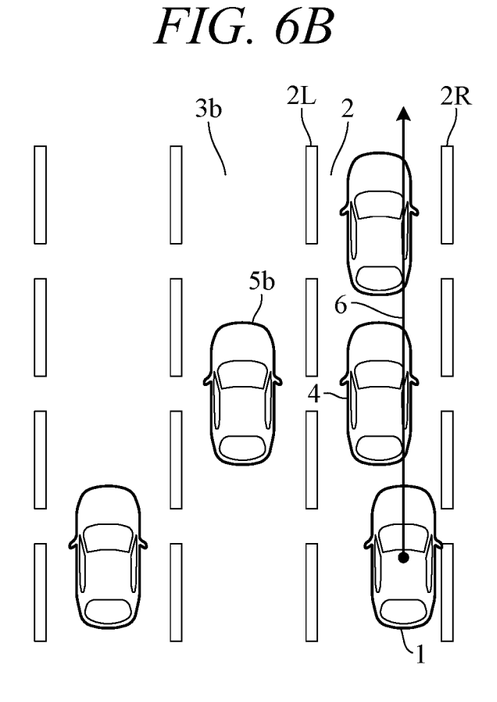
FIG. 6B is a diagram illustrating a modification of FIG. 3B.
Figure 6C:
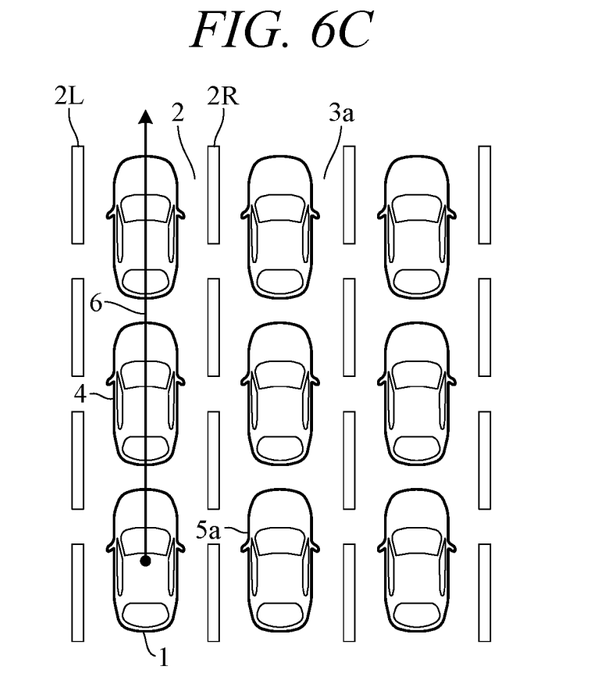
FIG. 6C is a diagram illustrating a modification of FIG. 4A.
Figure 6D:
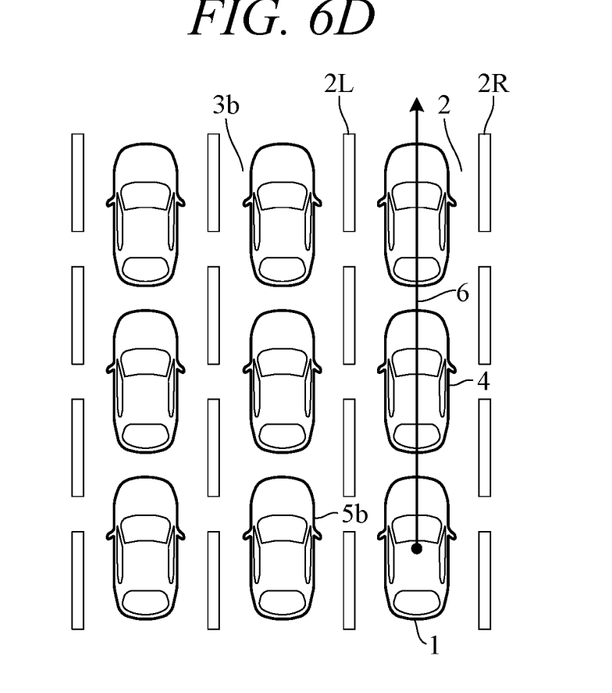
FIG. 6D is a diagram illustrating a modification of FIG. 4B.
Figure 6E:
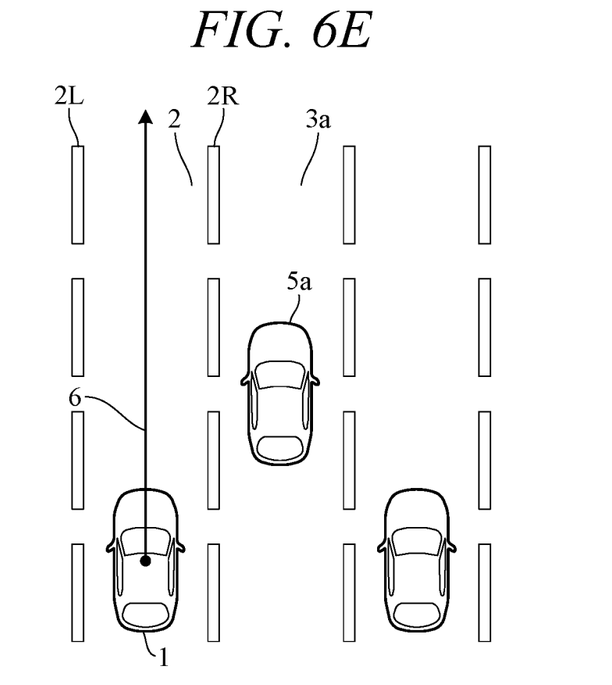
FIG. 6E is a diagram illustrating a modification of FIG. 5A.
Figure 6F:
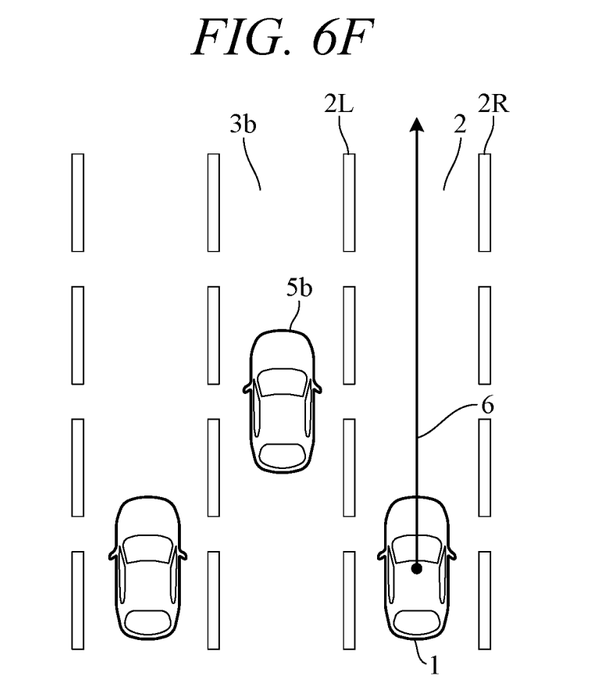
FIG. 6F is a diagram illustrating a modification of FIG. 5B.
Figure 6G:
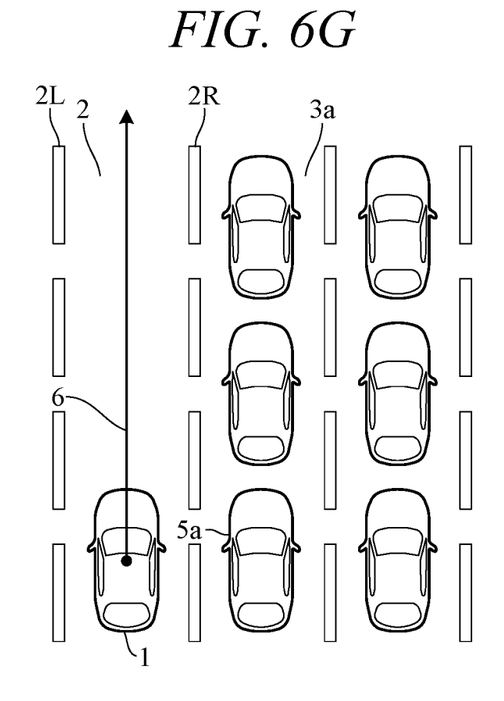
FIG. 6G is a diagram illustrating a modification of FIGS. 5A and 6E.
Figure 6H:
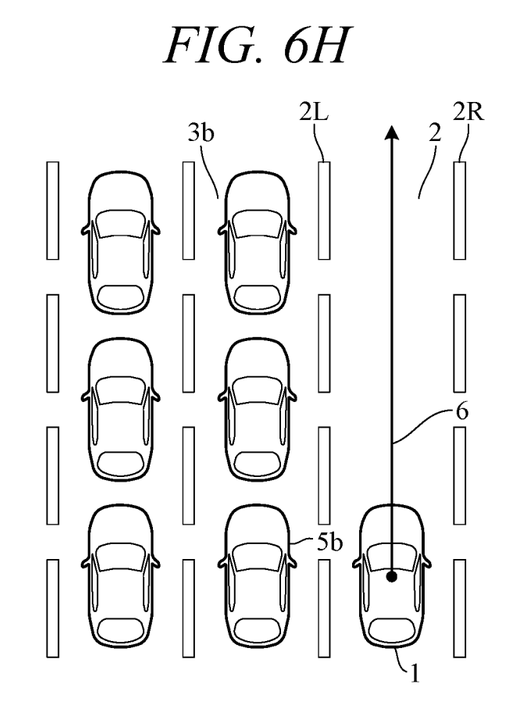
FIG. 6H is a diagram illustrating a modification of FIGS. 5B and 6F.

FIGS. 3A and 3B are diagrams each illustrating the target path 6 in a case where the own lane 2 is congested and the adjacent lanes 3a and 3b are not congested, and FIGS. 4A and 4B are diagrams each illustrating the target path 6 in a case where both the own lane 2 and the adjacent lanes 3a and 3b are congested. FIGS. 5A and 5B are diagrams each illustrating the target path 6 in a case where the own lane 2 is not congested. FIGS. 6A to 6F are diagrams respectively illustrating modifications of FIGS. 3A to 5B. FIG. 6G is a diagram illustrating a modification of FIGS. 5A and 6E, and FIG. 6H is a diagram illustrating a modification of FIGS. 5B and 6F. In FIGS. 3A to 6H, a case where either the adjacent lane 3a or 3b is present only on either the right or left side of the own lane 2 will be described.

As illustrated in FIGS. 3A and 4A, in a case where the congestion determination unit 17 determines that the own lane 2 is congested and the adjacent lane 3a on the right side is not congested (FIG. 3A), the path generation unit 18 generates the target path 6 that is offset with respect to that of a case where it is determined that both the own lane 2 and the adjacent lane 3a are congested (FIG. 4A). More specifically, the path generation unit 18 generates the target path 6 that is offset to a side away from the adjacent lane 3a, in which the adjacent vehicle 5a having a high relative speed with respect to the own vehicle 1 is traveling.

In this case, for example, the target path 6 is offset to a side away from the adjacent lane 3a by a predetermined distance with respect to the center line 2C of the own lane 2. The target path 6 may be offset to a side away from the adjacent lane 3a by a predetermined distance with respect to the center of the preceding vehicle 4. The target path 6 may be offset such that a left-side lateral end of the own vehicle 1 that is an opposite side of the adjacent lane 3a is aligned at a certain distance from the left division line 2L. In a case where the vehicle width of the own vehicle 1 is larger than the vehicle width of the preceding vehicle 4, the target path 6 may be offset such that a right-side lateral end of the own vehicle 1 that is on the adjacent lane 3a side is aligned with a right-side lateral end of the preceding vehicle 4. Also in this case, the offset is conducted so that a certain distance is kept between the left-side lateral end of the own vehicle 1 and the left division line 2L. The same applies to FIGS. 6A and 6C.

As illustrated in FIGS. 3B and 4B, in a case where the congestion determination unit 17 determines that the own lane 2 is congested and the adjacent lane 3b on the left side is not congested (FIG. 3B), the path generation unit 18 generates the target path 6 that is offset with respect to that of a case where it is determined that both the own lane 2 and the adjacent lane 3b are congested (FIG. 4B). More specifically, the path generation unit 18 generates the target path 6 that is offset to a side away from the adjacent lane 3b, in which the adjacent vehicle 5b having a high relative speed with respect to the own vehicle 1 is traveling. The same applies to FIGS. 6B and 6D.

As illustrated in FIGS. 5A, 5B, and 6E to 6H, in a case where the congestion determination unit 17 determines that the own lane 2 is not congested, the path generation unit 18 generates the reference target path 6 without offset. Specifically, in a case where the own lane 2 is congested, even though the adjacent vehicles 5a and 5b, which are traveling closely to the own lane 2, are each approaching from the rear lateral sides, it is difficult to control the own vehicle 1 to be immediately away from the adjacent lanes 3a and 3b. For this reason, it is difficult to ensure a sufficient distance for mitigating an occupant's uneasy feeling by the time when the adjacent vehicles 5a and 5b pass by on the lateral sides of the own vehicle 1. On the other hand, in a case where the own lane 2 is not congested, the target path 6 is updated, based on a recognition result by the surroundings recognition unit 16, and it is possible to control the own vehicle 1 to be immediately away from the adjacent lanes 3a and 3b.

Figure 7A:
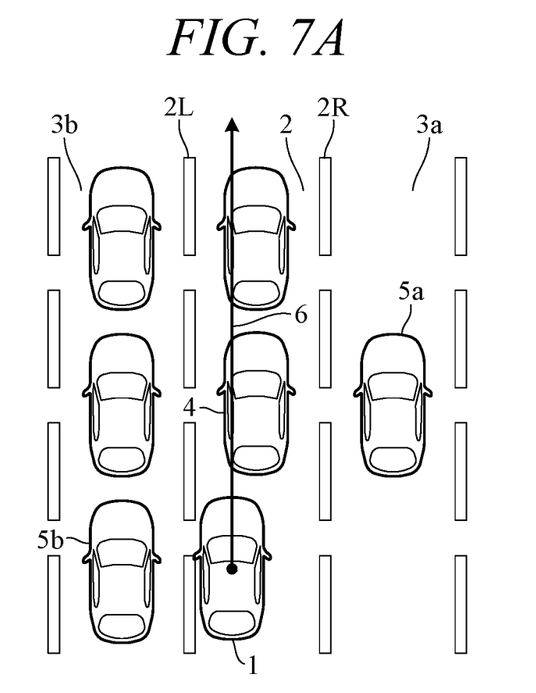
FIG. 7A is a diagram illustrating an example of the target path of a case where the own lane and the adjacent lane on the left side are congested and the adjacent lane on the right side is not congested.
Figure 7B:
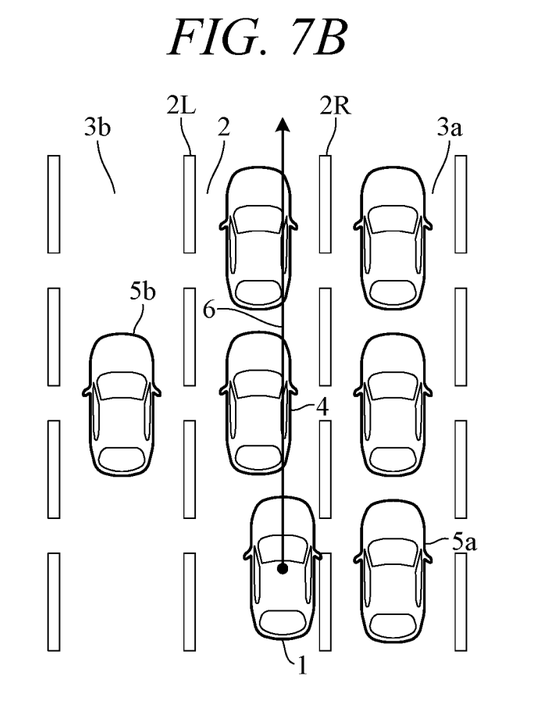
FIG. 7B is a diagram illustrating an example of the target path of a case where the own lane and the adjacent lane on the right side are congested and the adjacent lane on the left side is not congested.
Figure 7C:
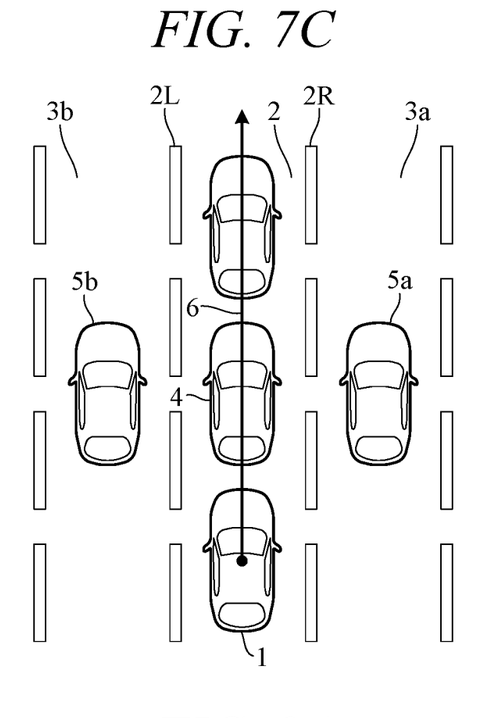
FIG. 7C is a diagram illustrating an example of the target path of a case where the own lane is congested and neither the adjacent lane on the right side nor the adjacent lane on the left side is congested.
Figure 8A:
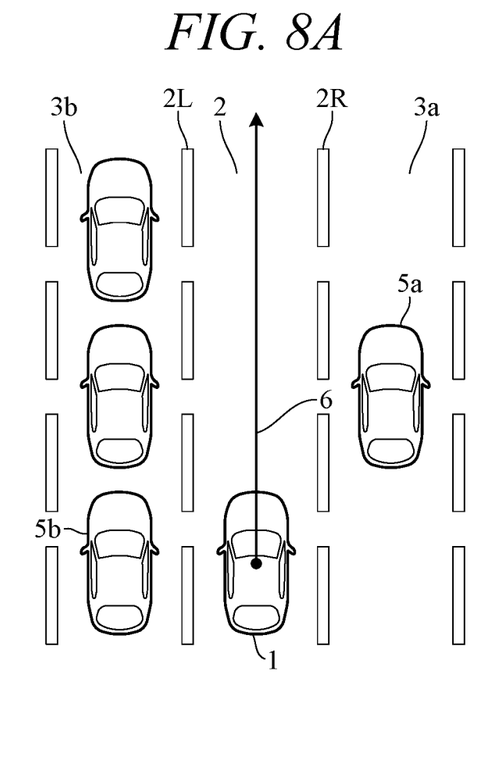
FIG. 8A is a diagram illustrating an example of the target path of a case where the own lane is not congested.
Figure 8B:
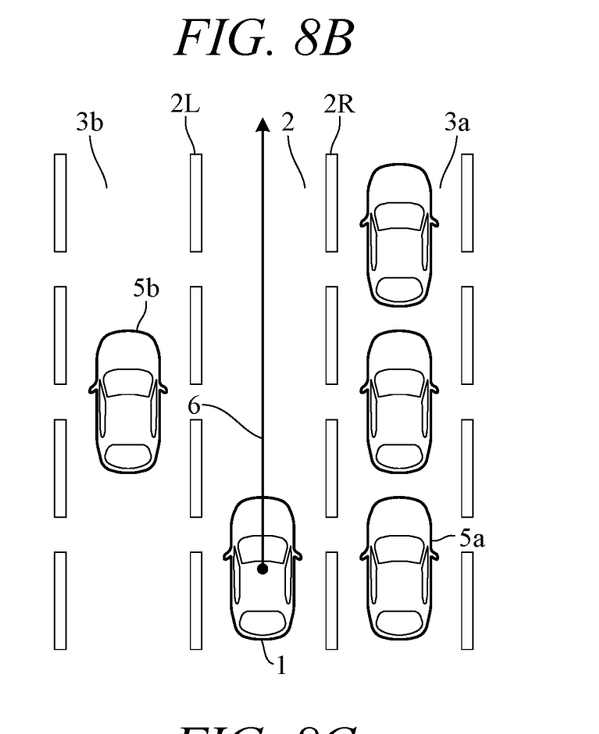
FIG. 8B is a diagram illustrating a modification of FIG. 8A.
Figure 8C:
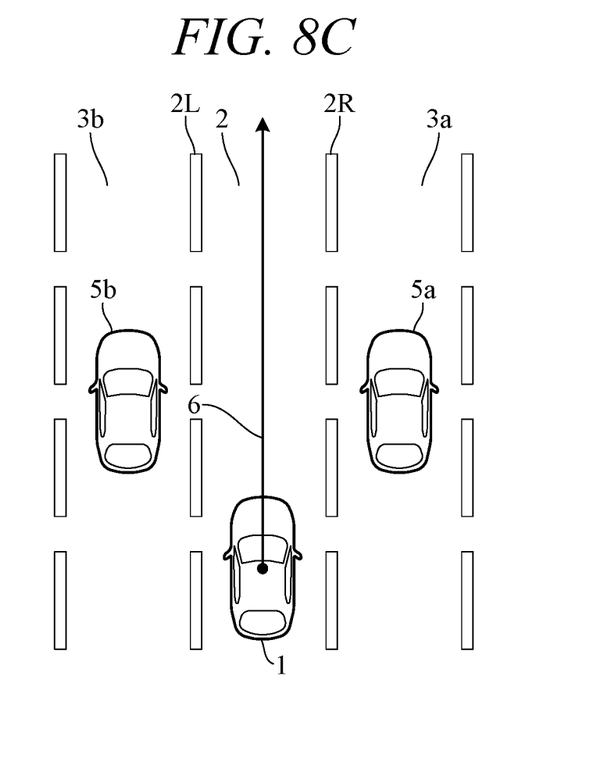
FIG. 8C is a diagram illustrating another modification of FIG. 8A.

FIG. 7A is a diagram illustrating the target path 6 of a case where the own lane 2 and the adjacent lane 3b on the left side are congested and the adjacent lane 3a on the right side is not congested. FIG. 7B is a diagram illustrating the target path 6 of a case where the own lane 2 and the adjacent lane 3a on the right side are congested and the adjacent lane 3b on the left side is not congested. FIG. 7C is a diagram illustrating the target path 6 of a case where the own lane 2 is congested and neither the adjacent lane 3a nor 3b on the right or left side is congested. FIGS. 8A to 8C are diagrams each illustrating the target path 6 of a case where the own lane 2 is not congested. In FIGS. 7A to 8C, a case where the adjacent lanes 3a and 3b are respectively present on both the right and left sides of the own lane 2 will be described.

As illustrated in FIGS. 7A to 7C, in a case where the own lane 2 and either one of the adjacent lane 3a or 3b is congested and the other one of the adjacent lane 3a or 3b is not congested (FIGS. 7A and 7B), the path generation unit 18 generates the target path 6 that is offset with respect to that of a case where neither the adjacent lane 3a nor 3b on the right or left side is congested (FIG. 7C). More specifically, the path generation unit 18 generates the target path 6 that is offset to a side away from either the adjacent lane 3a or 3b that is not congested. As illustrated in FIG. 7C, in a case where neither the adjacent lane 3a nor 3b on the right or left side is congested, the relative speeds of the adjacent vehicles 5a and 5b on both the right and left sides with respect to the own vehicle 1 increase, and the target path 6 is away from one side and thus gets closer to the other side. Hence, the reference target path 6 is generated without offset.

As illustrated in FIGS. 8A to 8C, in a case where the congestion determination unit 17 determines that the own lane 2 is not congested, the path generation unit 18 generates the reference target path 6 without offset.

In this manner, by respectively determining whether the own lane 2 and the adjacent lanes 3a and 3b on the right and left sides are congested, and offsetting the target path 6 to a side away from one of the adjacent lanes 3a and 3b, which is not congested, as necessary, it becomes possible to generate the target path 6 that is capable of mitigating an occupant's uneasy feeling. Specifically, also when neither the adjacent lane 3a nor 3b is congested, although the own lane 2 is congested, it becomes possible to generate the target path 6 that is capable of mitigating an occupant's uneasy feeling caused by the adjacent vehicles 5a and 5b passing by on the lateral sides of the own vehicle 1.

The travel control unit 19 controls the travel actuator 11 to conduct driving assistance for the driver of the own vehicle 1 or to automatically drive the own vehicle 1, based on the target path 6 that has been generated by the path generation unit 18.

Accordingly, also when neither the adjacent lane 3a nor 3b is congested, although the own lane 2 is congested, it becomes possible to cause the own vehicle 1 to travel along the target path 6 that is capable of mitigating an occupant's uneasy feeling caused by the adjacent vehicles 5a and 5b passing by on the lateral sides of the own vehicle 1.

Figure 9:
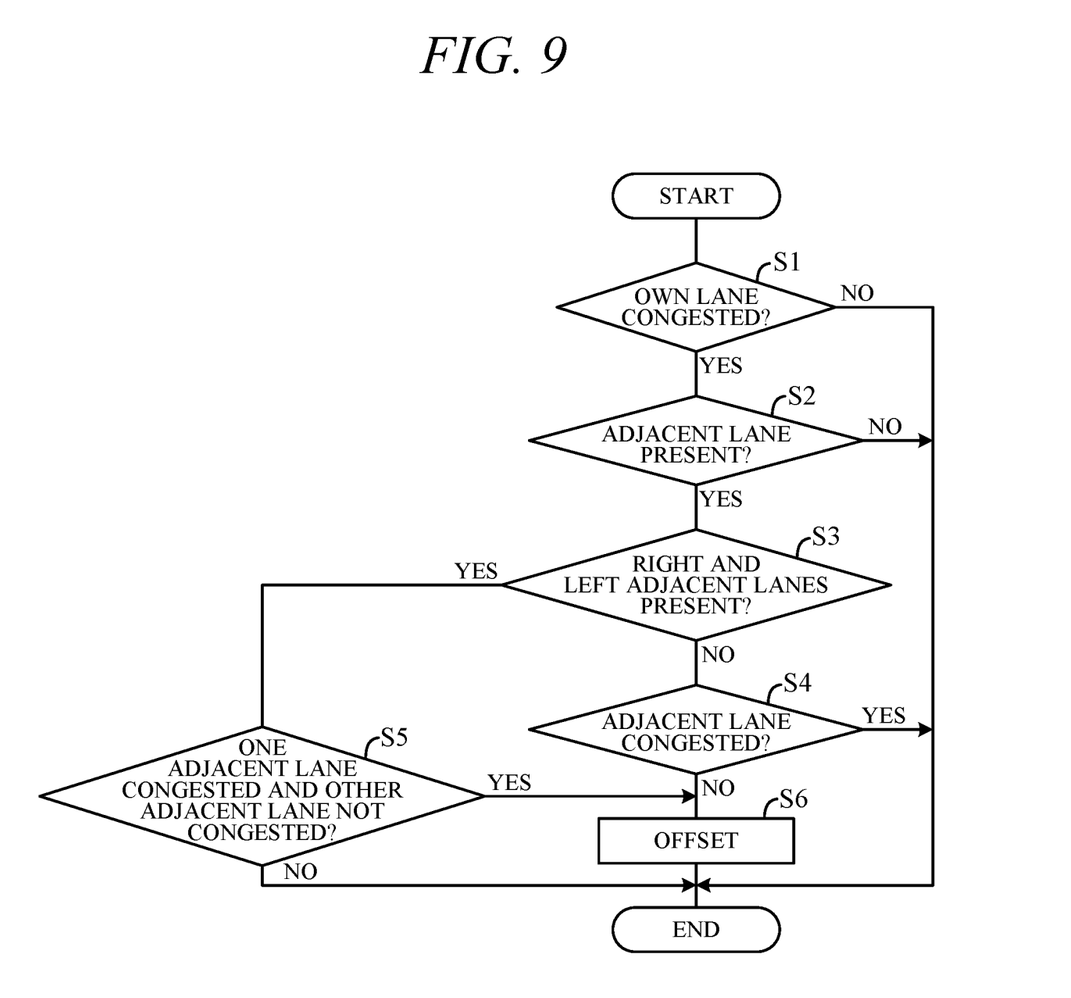
FIG. 9 is a flowchart illustrating an example of a flow of offset determination processing by the path generation apparatus according to the embodiment of the present invention.

FIG. 9 is a flowchart illustrating a flow of offset determination processing by the apparatus 100, and illustrates a flow of processing of a program to be executed by the arithmetic unit of the apparatus 100. The processing of FIG. 9 is started, for example, when the own vehicle 1 starts operating and the ECU 10 is activated, and is repeated at a predetermined cycle.

First, in S1 (S denotes a processing step), it is determined whether the own lane 2 is congested, based on a signal from the vehicle speed sensor 12. In a case where a positive determination is made in S1, the processing proceeds to S2 (FIGS. 3A to 4B, FIGS. 6A to 6D, and FIGS. 7A to 7C), and in a case where a negative determination is made, the processing ends (FIG. 5A, FIG. 5B, FIGS. 6E to 6H, and FIGS. 8A to 8C). In S2, it is determined whether the adjacent lane 3a or 3b is present on either the right or left side of the own lane 2. In a case where a positive determination is made in S2, the processing proceeds to S3 (FIGS. 3A to 4B, FIGS. 6A to 6D, and FIGS. 7A to 7C), and in a case where a negative determination is made, the processing ends.

In S3, it is determined whether the adjacent lanes 3a and 3b are present on the right and left sides of the own lane 2. In a case where a negative determination is made in S3, the processing proceeds to S4 (FIGS. 3A to 4B and FIGS. 6A to 6D), and in a case where a positive determination is made, the processing proceeds to S5 (FIGS. 7A to 7C). In S4, it is determined whether the adjacent lane 3a or 3b, which is present only on either the right or left side of the own lane 2, is congested. In a case where a negative determination is made in S4, the processing proceeds to S6, and it is determined that the offset is conducted (FIG. 3A, FIG. 3B, FIG. 6A, and FIG. 6B), and in a case where a positive determination is made, the processing ends (FIG. 4A, FIG. 4B, FIG. 6C, and FIG. 6D).

In S5, it is determined whether either one of the adjacent lane 3a or 3b, which is present on the right or left side of the own lane 2, is congested and the other is not congested. In a case where a positive determination is made in S5, the processing proceeds to S6, and it is determined that the offset is conducted (FIG. 7A and FIG. 7B), and in a case where a negative determination is made, the processing ends (FIG. 7C).

The present embodiment is capable of achieving the following operations and effects.

(1) The apparatus 100 includes: the vehicle speed sensor 12, which detects a travel speed of the own vehicle 1 traveling in the own lane 2; the external sensor 13, which detects an object in a surrounding area of the own vehicle 1; the surroundings recognition unit 16, which recognizes adjacent vehicles 5a and 5b respectively traveling in adjacent lanes 3a and 3b adjacent to the own lane 2 from among objects that have been detected by the external sensor 13; the congestion determination unit 17, which determines whether the own lane 2 is congested based on the travel speed of the own vehicle 1 that has been detected by the vehicle speed sensor 12, and which also determines whether the adjacent lanes 3a and 3b are congested based on a recognition result by the surroundings recognition unit 16; and the path generation unit 18, which generates the target path 6 of the own vehicle 1 (FIG. 1).

In a case where the congestion determination unit 17 determines that the own lane 2 is congested and neither the adjacent lane 3a nor 3b is congested, the path generation unit 18 generates the target path 6 on a side away from the adjacent lanes 3a and 3b with respect to that of a case where the congestion determination unit 17 determines that the own lane 2 is congested and the adjacent lanes 3a and 3b are congested. Accordingly, also when neither the adjacent lane 3a nor 3b is congested, although the own lane 2 is congested, it becomes possible to mitigate an occupant's uneasy feeling caused by the adjacent vehicles 5a and 5b passing by on the lateral sides of the own vehicle 1.

(2) The adjacent lane 3b is further adjacent to the own lane 2 on an opposite side of the adjacent lane 3a (FIGS. 7A to 8C). In a case where the congestion determination unit 17 determines that the own lane 2 is congested, either the adjacent lane 3a or 3b is congested, and the other is not congested, the path generation unit 18 generates the target path 6 on a side away from the adjacent lanes 3a and 3b with respect to that of a case where the congestion determination unit 17 determines that the own lane 2 is congested and neither the adjacent lane 3a nor 3b is congested. This enables generation of an appropriate target path 6 in accordance with a situation of each traffic lane, even in the case where the adjacent lanes 3a and 3b are respectively present on the right and left sides of the own lane 2.

(3) In a case where it is determined that the own lane 2 is congested, the congestion determination unit 17 identifies the relative speeds of the adjacent vehicles 5a and 5b with respect to the own vehicle 1, based on the recognition result by the surroundings recognition unit 16, determines that the adjacent lanes 3a and 3b are congested in a case where the relative speeds that have been identified are equal to or lower than a predetermined relative speed, and determines that neither the adjacent lane 3a nor 3b is congested in a case where the relative speeds exceeds the predetermined relative speed. This enables accurate determination of the situation in which an occupant possibly has an uneasy feeling caused by the adjacent vehicles 5a and 5b passing by on the lateral sides of the own vehicle 1. By offsetting the target path 6 as necessary, it becomes possible to generate an appropriate target path 6.

(4) The external sensor 13 detects an object in a surrounding area including the rear lateral sides of the own vehicle 1. This enables accurate detection of the relative speeds of the adjacent vehicles 5a and 5b with respect to the own vehicle 1.

(5) The apparatus 100 further includes the travel control unit 19, which controls the travel actuator 11 to conduct driving assistance for the driver of the own vehicle 1 or to automatically drive the own vehicle 1 (FIG. 1). The travel control unit 19 controls the travel actuator 11, based on the target path 6 that has been generated by the path generation unit 18. Accordingly, also when neither the adjacent lane 3a nor 3b is congested, although the own lane 2 is congested, it becomes possible to cause the own vehicle 1 to travel along the target path 6 that is capable of mitigating an occupant's uneasy feeling caused by the adjacent vehicles 5a and 5b passing by on the lateral sides of the own vehicle 1.

In the above embodiments, an example in which the travel speed of the own vehicle 1 is detected by the vehicle speed sensor 12 such as a wheel speed sensor has been described. However, a speed information acquisition unit that acquires speed information of the own vehicle is not limited to such an example. For example, the vehicle location may be measured, based on a positioning signal from a positioning satellite, and the vehicle speed may be calculated, based on changes in the vehicle location over time.

In the above embodiments, an example in which the external sensor 13 includes the camera 14 and the distance detection unit 15 such as a millimeter wave radar or a light detection and ranging (LiDAR) has been described. However, a detection unit that detects an object in a surrounding area of the own vehicle is not limited to such an example. For example, the distance from the own vehicle 1 to the object in a surrounding area may be detected, based on image data of the surrounding area that has been imaged by the camera 14. In this case, the external sensor 13 may be made up of only the camera 14.

In the above embodiments, in FIGS. 3A to 8C, the inter-vehicle distance between the vehicles in the adjacent lanes 3a and 3b that are congested is indicated to be shorter, and the inter-vehicle distance between the vehicles in the adjacent lanes 3a and 3b that are not congested is indicated to be longer. However, the mode of the presence or absence of congestion to be determined by the congestion determination unit is not limited to such an example. Specifically, the congestion determination unit 17 identifies the relative speeds of the adjacent vehicles 5a and 5b with respect to the own vehicle 1, based on the recognition result by the surroundings recognition unit 16, and determines whether the adjacent lanes 3a and 3b are congested, based on the relative speeds that have been identified. Therefore, for example, in a case where the relative speed of a vehicle line, including the plurality of adjacent vehicles 5a and 5b traveling in line by automatic driving, with respect to the own vehicle 1 included in traffic congestion exceeds a predetermined relative speed, it is determined that neither the adjacent lane 3a nor 3b is congested.

In the above embodiments, the description has been given for an example in which the path generation unit 18 generates the reference target path 6 along the center line 2C of the own lane 2 in a case where no offset is conducted. However, the path generation unit that generates the target path of the own vehicle is not limited to such an example. For example, the reference target path 6 closer to the outside of the road than to the center line 2C may be generated, based on a setting value that is changeable in accordance with a driver's preference or a learning value based on a driver's travel history. The reference target path 6 closer to an inside of a turning direction than to the center line 2C may be generated in accordance with a curvature radius of the own lane 2.

In the above embodiments, an example in which the apparatus 100 includes the travel control unit 19 has been described. However, the path generation apparatus is not limited to such an example. For example, a display control unit, which controls a display unit such as a head-up display for displaying the target path 6 that has been generated by the path generation unit 18 to be superimposed on a road on a forward side of the vehicle, may be included.

The above embodiment can be combined as desired with one or more of the aforesaid modifications. The modifications can also be combined with one another.

According to the present invention, it becomes possible to mitigate an occupant's uneasy feeling caused by another vehicle passing by on a lateral side of the own vehicle, even when the adjacent lane is not congested, although the own lane is congested.

Above, while the present invention has been described with reference to the preferred embodiments thereof, it will be understood, by those skilled in the art, that various changes and modifications may be made thereto without departing from the scope of the appended claims.

The invention claimed is:

1. A path generation apparatus configured to generate a target path of an own vehicle traveling in an own lane, comprising:
  a sensor configured to detect objects in a surrounding area of the own vehicle; and
  an electronic control unit including a processor and a memory coupled to the processor, wherein
  the electronic control unit is configured to perform:
    recognizing an adjacent vehicle traveling in an adjacent lane adjacent to the own lane from among the objects detected by the sensor, the adjacent lane including a first adjacent lane and a second adjacent lane adjacent to the own lane on opposite sides of each other;
    determining whether the own lane is congested based on a travel speed of the own vehicle and determining whether the adjacent lane is congested based on a recognition result of the adjacent lane;
    generating the target path of the own vehicle; and controlling a travel actuator based on the target path to conduct driving assistance for a driver of the own vehicle or to automatically drive the own vehicle, wherein the generating the target path includes, in a case where the own lane is determined to be congested, the first adjacent lane is determined to be congested, and the second adjacent lane is determined not to be congested, generating the target path on a side away from the second adjacent lane in the own lane.

2. The path generation apparatus according to claim 1, wherein the determining includes:
identifying a relative speed of the adjacent vehicle with respect to the own vehicle based on a recognition result of the adjacent vehicle when the own lane is determined to be congested; and
determining that the adjacent lane is congested when the relative speed is equal to or lower than a predetermined relative speed, while determining that the adjacent lane is not congested when the relative speed exceeds the predetermined relative speed.

3. The path generation apparatus according to claim 1, wherein
the sensor detects the objects in the surrounding area including rear lateral sides of the own vehicle.

4. The path generation apparatus according to claim 1, wherein
the sensor includes a camera.

5. The path generation apparatus according to claim 1, wherein
the generating the target path includes generating the target path on the side away from the second adjacent lane in the own lane by:
offsetting the target path to the side away from the second adjacent lane in the own lane by a predetermined distance with respect to a center line of the own lane;
offsetting the target path to the side away from the second adjacent lane in the own lane by a predetermined distance with respect to a center of a preceding vehicle;
offsetting the target path such that a lateral end of the own vehicle opposed to the second adjacent lane is aligned at a certain distance from a division line opposed to the second adjacent lane; or
offsetting the target path such that a lateral end of the own vehicle on the adjacent lane side is aligned with a lateral end of the preceding vehicle on the adjacent lane side.

6. A path generation method configured to generate a target path of an own vehicle traveling in an own lane, comprising:
recognizing an adjacent vehicle traveling in an adjacent lane adjacent to the own lane from among objects in a surrounding area of the own vehicle detected by a sensor, the adjacent lane including a first adjacent lane and a second adjacent lane adjacent to the own lane on opposite sides of each other;
determining whether the own lane is congested based on a travel speed of the own vehicle and determining whether the adjacent lane is congested based on a recognition result of the adjacent lane;
generating the target path of the own vehicle; and
controlling a travel actuator based on the target path to conduct driving assistance for a driver of the own vehicle or to automatically drive the own vehicle, wherein
the generating the target path includes, in a case where the own lane is determined to be congested, the first adjacent lane is determined to be congested, and the second adjacent lane is determined not to be congested, generating the target path on a side away from the second adjacent lane in the own lane.

7. The path generation method according to claim 6, wherein the determining includes:
identifying a relative speed of the adjacent vehicle with respect to the own vehicle based on a recognition result of the adjacent vehicle when the own lane is determined to be congested; and
determining that the adjacent lane is congested when the relative speed is equal to or lower than a predetermined relative speed, while determining that the adjacent lane is not congested when the relative speed exceeds the predetermined relative speed.

8. The path generation method according to claim 6, wherein
the sensor detects the objects in the surrounding area including rear lateral sides of the own vehicle.

9. The path generation method according to claim 6, wherein
the sensor includes a camera.

10. The path generation method according to claim 6, wherein
the generating the target path includes generating the target path on the side away from the second adjacent lane in the own lane by:
offsetting the target path to the side away from the second adjacent lane in the own by a predetermined distance with respect to a center line of the own lane;
offsetting the target path to the side away from the second adjacent lane in the own lane by a predetermined distance with respect to a center of a preceding vehicle;
offsetting the target path such that a lateral end of the own vehicle opposed to the second adjacent lane is aligned at a certain distance from a division line opposed to the second adjacent lane; or
offsetting the target path such that a lateral end of the own vehicle on the adjacent lane side is aligned with a lateral end of the preceding vehicle on the adjacent lane side.

* * * * *